US006809505B2

(12) United States Patent
Peeke et al.

(10) Patent No.: US 6,809,505 B2
(45) Date of Patent: Oct. 26, 2004

(54) STORAGE SYSTEM AND METHOD OF DETECTING AN IMPROPER CABLE CONNECTION IN THE STORAGE SYSTEM

(75) Inventors: Douglas E. Peeke, Shrewsbury, MA (US); Brian K. Bailey, Sterling, MA (US); Geoffrey Reid, Waltham, MA (US); James M. Tuttle, Lunenburg, MA (US)

(73) Assignee: EMC Corporation, Hopkinton, MA (US)

( * ) Notice: Subject to any disclaimer, the term of this patent is extended or adjusted under 35 U.S.C. 154(b) by 55 days.

(21) Appl. No.: 10/255,223

(22) Filed: Sep. 26, 2002

(65) Prior Publication Data

US 2004/0061486 A1 Apr. 1, 2004

(51) Int. Cl.[7] .................. G01R 19/00; G06F 15/173
(52) U.S. Cl. ...................... 324/66; 324/538; 709/224
(58) Field of Search .................. 324/66, 538, 537; 379/25, 26.01, 1.01; 709/224; 370/227, 245

(56) References Cited

U.S. PATENT DOCUMENTS

| 5,107,532 A | * | 4/1992 | Hansen et al. ............. 379/25 |
| 5,448,675 A | * | 9/1995 | Leone et al. ............. 385/135 |
| 5,522,046 A | * | 5/1996 | McMillen et al. ......... 709/239 |
| 5,679,987 A | * | 10/1997 | Ogawa .................... 307/147 |
| 5,841,997 A | | 11/1998 | Bleiweiss et al. ......... 710/317 |
| 5,890,214 A | | 3/1999 | Espy et al. ............... 375/259 |
| 5,901,151 A | | 5/1999 | Bleiweiss et al. ......... 370/480 |
| 6,421,711 B1 | * | 7/2002 | Blumenau et al. ........ 709/213 |
| 6,425,049 B1 | | 7/2002 | Yamamoto et al. ....... 711/112 |
| 2002/0044562 A1 | | 4/2002 | Killer, Jr. et al. ......... 370/406 |
| 2002/0046276 A1 | | 4/2002 | Coffey et al. ............. 709/224 |

* cited by examiner

*Primary Examiner*—Anjan K. Deb
(74) *Attorney, Agent, or Firm*—Guerin & Rodriguez, LLP; Michael A. Rodriquez

(57) ABSTRACT

Described are a system and method of detecting an improperly connected cable in a storage system. A system includes an enclosure having boards. Each board of the enclosure has a communications port that receives a message identifying a redundant backend network to which that board is connected. The enclosure determines whether the system has an improper cable connection by determining from the messages whether the boards are connected to the same redundant backend network.

20 Claims, 5 Drawing Sheets

STORAGE SYSTEM AND METHOD OF DETECTING AN IMPROPER CABLE CONNECTION IN THE STORAGE SYSTEM

FIELD OF THE INVENTION

The invention relates generally to storage systems. More particularly, the invention relates to a system and method of detecting an improper cable connection in a storage system.

BACKGROUND

A typical storage system includes one or more racks of storage devices or enclosures. A loop is a common topology in which the enclosures of a storage system are connected. Communication signals traverse the loop in one direction and pass from enclosure to enclosure in a daisy-chain fashion. Enclosures receiving communication signals targeted for another enclosure forward those signals along the loop.

An example of a prior art storage system 100 is shown in FIG. 1. This storage system 100 has a plurality of enclosures 104, 104', 104" and 104''' generally, enclosure 104). Each enclosure 104 has a plurality of disk modules (not shown), and redundant link control cards (LCC) 108, 108' (generally, LCC 108), and redundant power supplies 112, 112' (generally, power supply 112). Partitioned into an "A" side and a "B" side, each enclosure 104 has redundant backend loops. One loop includes the "A" side of each enclosure 104 and the host processor 128 and the other loop includes the "B" side of the each enclosure 104 and the host processor 128'.

Each LCC 108 includes a primary communications port 116 and an expansion communications port 120. For clarity sake, reference numerals appear in FIG. 1 for the primary communications ports 116 and expansion communications ports 120 of the enclosure 104''' only. The communications ports 116, 120 are located at the side edges of the enclosure 104, with the expansion communications port 120 being positioned above the primary communications port 116.

Cables 124 connect the expansion communications port 120 of one enclosure 104 to the primary communications port 116 of the next enclosure 104 in the daisy-chain. Also, host processors 128, 128' (generally, host processor 128), which access the storage system 100 for data storage and retrieval, are each connected to the primary communications port 116 of one of the LCCs 108 of the enclosure 104'''. The host processors 128 are thus part of the redundant daisy-chained loops.

The location of the communications ports 116, 120 at the edges of the enclosures simplifies the cable connections between the enclosures 104. Typically the expansion communications port 120 of one enclosure is directly below and near the primary communications port 116 of the neighboring enclosure. Consequently, only two relatively short cables 124 pass between two neighboring enclosures 104, one cable 124 at each enclosure edge. Thus the cabling between enclosures 104 is relatively straightforward and improper cable connections between enclosures 104 easy to detect.

Storage systems, however, are becoming increasingly sophisticated and the cabling between enclosures increasingly complicated. Some storage systems employ more than one backend loop, thus increasing the number of cables that connect to each LCC and causing some cables to cross over other cables. A backend loop is the loop formed when the host processor is connected to the storage system 100. FIG. 1 has one backend loop on each host processor 128. The layout of LCCs and power supplies in an enclosure may vary from that shown in FIG. 1, requiring cables to be longer and to extend into the interior of the storage system rather than remain along the its edges. The final product can appear like a tangled nest of cables, and the possibility that the storage system has an improper cable connection becomes more likely. Moreover, the tangle of cables can complicate and frustrate attempts to troubleshoot a storage system with an improper cable connection. Visually inspecting the storage system to see if the cabling is done properly becomes more difficult and less trustworthy. Therefore, there is a need for a system and method for testing the connectivity of cables to detect a system with an improper cable connection.

SUMMARY

In one aspect, the invention features a system comprising an enclosure having boards. Each board has a communications port that receives a message identifying a redundant backend network to which that board is connected. The enclosure determines whether the system has an improper cable connection by determining from the messages whether the boards are connected to the same redundant backend network.

In another aspect, the invention features an enclosure for a system comprising a first and a second card. Each card has a communications port. A first cable conveys an identifier to the communications port of the first card, and a second cable conveys an identifier to the communications port of second card. Each identifier identifies a network to which the card receiving that identifier is connected. The enclosure also includes means for determining if the cards are connected to different networks based on the identifiers conveyed to the communications ports of the first and second cards.

In yet another aspect, the invention features a method of testing connectivity of cabling in a storage system that implements redundancy. A first identifier is received over a first cable at a first card in an enclosure. A second identifier is received over a second cable at a second card in the enclosure. The method also includes determining if the cards are connected to different networks based on the first and second identifiers.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention enables users of systems that implement redundancy to verify the cabling connections among enclosures in the systems and to notify such users when an improperly connected cable is detected. Although the following description uses a storage system and storage enclosures to illustrate the principles of the invention, it is to be understood that these principles also apply to other types of systems and enclosures that implement redundancy.

Figure 1:
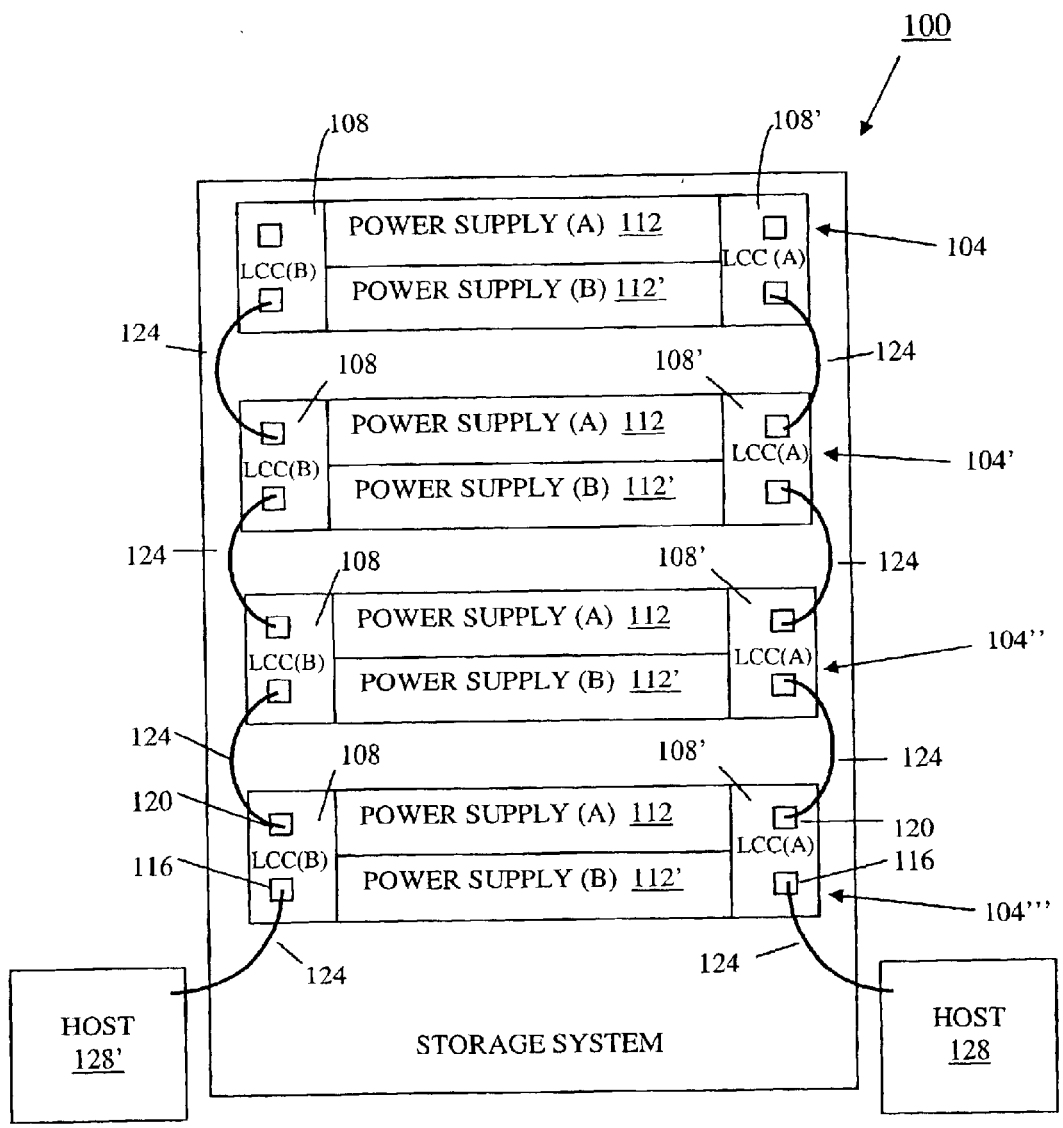
FIG. 1 is a prior art storage system.
Figure 2:
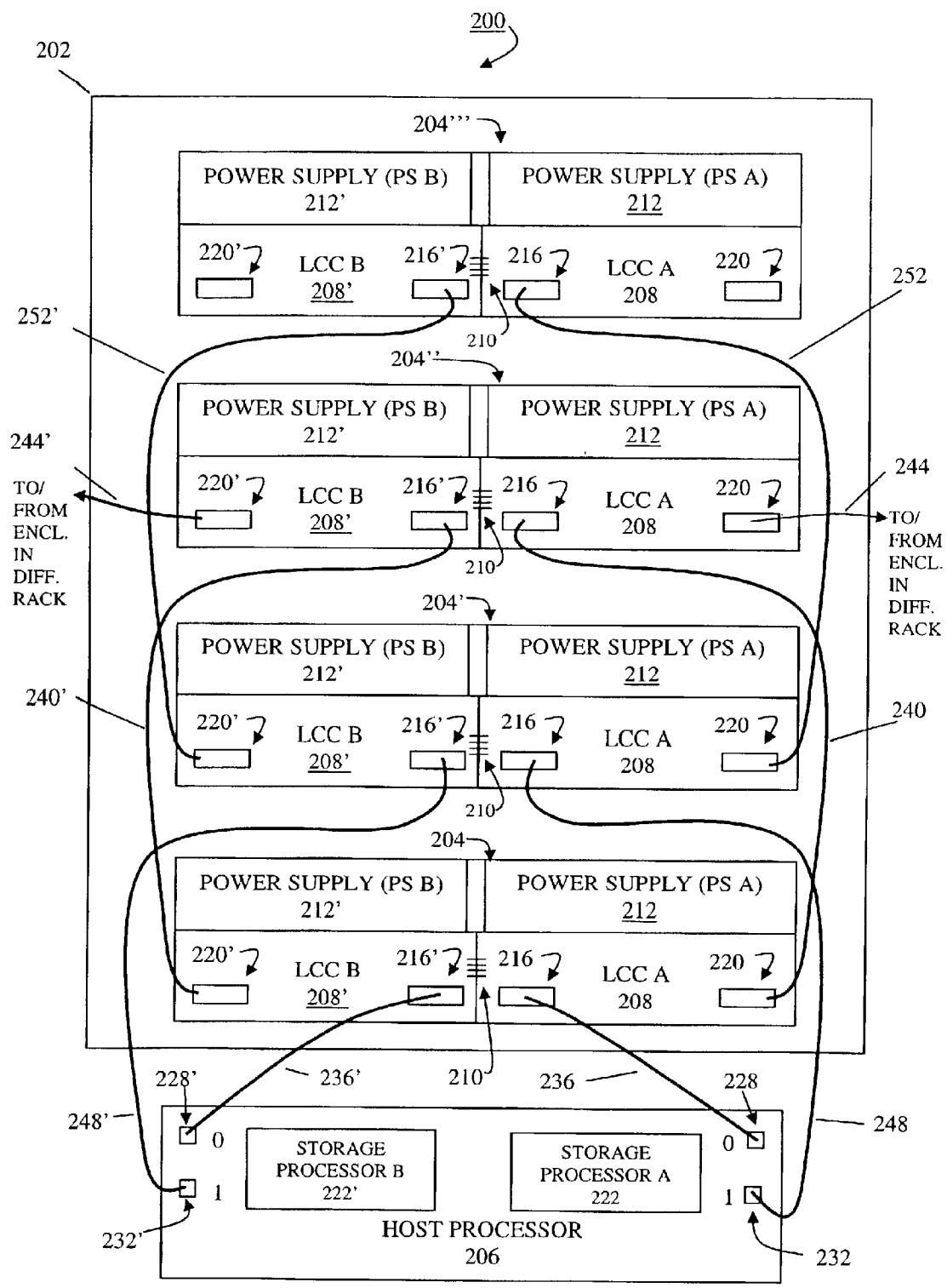
FIG. 2 is an embodiment of a storage system constructed in accordance with the principles of the invention.

FIG. 2 shows a rear view of an embodiment of a properly cabled storage system 200 constructed in accordance with the invention. The storage system 200 includes a rack 202 of enclosures 204, 204', 204", and 204'" (generally, enclosure 204) and a host processor enclosure 206. The enclosures 204 of the storage system 200 need not physically be in the same rack 202, but can be in separate racks. Also, although the host processor enclosure 206 is shown to be external to the rack 202, in some embodiments the rack 202 includes the host processor enclosure 206.

In general, each enclosure 204 is a storage device having a plurality of disk modules. Examples of storage devices include disk-array enclosures (DAE) and disk-array processor enclosures (DPE). A typical DAE includes a plurality of disk modules (e.g., fifteen), one or two link control cards (LCCs), and one or two power supplies. A typical DPE includes a plurality of disk modules (e.g., fifteen), one or two storage processors, one or two LCCs, and one or two power supplies. Disk modules include a carrier assembly that holds a disk drive and slides into the enclosure 204. Applications for the disk modules include, for example, JBOD (Just a Bunch Of Disks), RAID (Redundant Array of Independent Disks), and SAN (Storage Area Network).

In the illustrated embodiment, each enclosure 204 implements redundancy with an "A" side and a "B" side. Each side has a link control card (LCC) 208 and a power supply 212. Reference numerals for the B side components are the same as corresponding components on the A side with the addition of a prime (') designation. Each LCC 208, 208' includes an primary communications port 216, 216' (generally, primary port 216) and an expansion communications port 220, 220' (generally, expansion port 220). Also, the LCCs 208, 208' are in electrical communication with each other over a plurality of midplane connections 210. Although this embodiment is illustrated through the use of link control cards, it is to be understood that the principles of the invention apply to any enclosure card or board which performs a logic or control function and communicates with the other cards or processors.

The host processor enclosure 206 includes an A-side storage processor 222 and a B-side storage processor 222'. Each storage processor 222, 222' runs an operating system and uses the storage system 200 for data storage and retrieval. The storage system 200 communicates over a plurality of backend networks (also referred to as a backend). In general, a backend is a communication network by which the enclosures 204, 206 can exchange communications (e.g., commands, messages, data, etc.) with each other. Topologies for backend networks vary. In one embodiment, each backend has a loop topology. The present invention can extend to backends of different topologies (e.g. token rings, Ethernet).

In the embodiment shown, the storage system 200 communicates over a plurality of redundant backends, and associates an identifier (or value), e.g., a loop ID, with each redundant backend. Note that as used herein a backend is a single network that connects a set of enclosures, and that a redundant backend is a plurality of separate backend networks that connect the same set of enclosures. Other embodiments of the storage system 200 are connected to as many as eight backends. An embodiment of a storage system 200 implementing eight backends (identified by numbers 0–7), for example, includes at least eight enclosures, each enclosure being connected to one of the eight backends.

Referring to the embodiment shown in FIG. 2, each storage processor 222 is in communication with each of the enclosures 204 by the redundant backends. Communication over backend 0 is through communications ports 228, 228' and over backend 1 is through communications ports 232 and 232'. The labels 0 and 1 adjacent to the communications ports identify the backend with which that communications port is associated. The communications ports 228, 232 provide hardware pathways by which communication signals pass into and out of the host processor enclosure 206.

For redundant backend 0, when properly connected, the cables 236, 236' connect communications ports 228, 228' to the respective primary port 216, 216' of the LCCs 208, 208'. of the enclosure 204, cables 240, 240' connect the respective expansion port 220, 220' of the LCCs 208, 208' of the enclosure 204 to the respective primary port 216, 216' of the LCCs 208, 208' of the enclosure 204", and cables 244, 244' connect the respective expansion port 220, 220' of the LCCs 208, 208' of the enclosure 204" to the primary port of an external enclosure (not shown).

For backend 1, when properly connected the cables 248, 248' connect the communications ports 232, 232' to the respective primary port 216, 216 of the LCCs 208, 208' of the enclosure 204' and cables 252, 252' connect the respective expansion port 220, 220' of the LCCs 208, 208' of the enclosure 204' to the respective primary port 216, 216' of the LCCs 208, 208' of the enclosure 204'". These backends are illustrative only. The principles of the invention apply to backends that include more or fewer enclosures.

In one embodiment, each redundant backend includes redundant loops that include the host processor 206 and enclosures 204. In this embodiment, each of the above-described cables includes two unidirectional paths in opposite directions. More specifically, the redundant loops associated with redundant backend 0 include the host processor enclosure 206, the enclosures 204 and 204", and one or more other enclosures located in a different rack. The redundant loops associated with backend 1 include the host processor enclosure 206 and the enclosures 204' and 204'". In one embodiment, the loops are Fibre Channel arbitrated loops. Fibre Channel is a computer communications protocol for communicating data signals at a data rate of up to 2 Gbps. In general, the Fibre Channel protocol provides an interface by which host processors (and servers) communicate with enclosures and with the disk modules installed within the enclosures. The Fibre Channel arbitrated loop can support up to 126 nodes on the loop. In this embodiment, up to 120 disk modules and one storage processor are on the loop.

For the storage system 200 to be operational, the LCCs 208, 208' of an enclosure 204 need to be connected to the same redundant backend. As a representative example, if the primary port 216 of LCC 208 of the enclosure 204' is connected to the backend 0, then the primary port 216' of the LCC 208' of the enclosure 204' also needs to be connected to the backend 0. If the LCCs 208, 208' are connected to different backend loop numbers, this mismatch is indicative of a system with an improperly connected cable. In the present invention, the storage processors 222, 222' execute software that confirms whether the LCCs of an enclosure are connected to the same backend loop numbers, as described in more detail below. Also, the LCCs 208 of an enclosure 204 can each detect an improper cable connection and trigger an alarm to alert a user of the problem.

Figure 3:
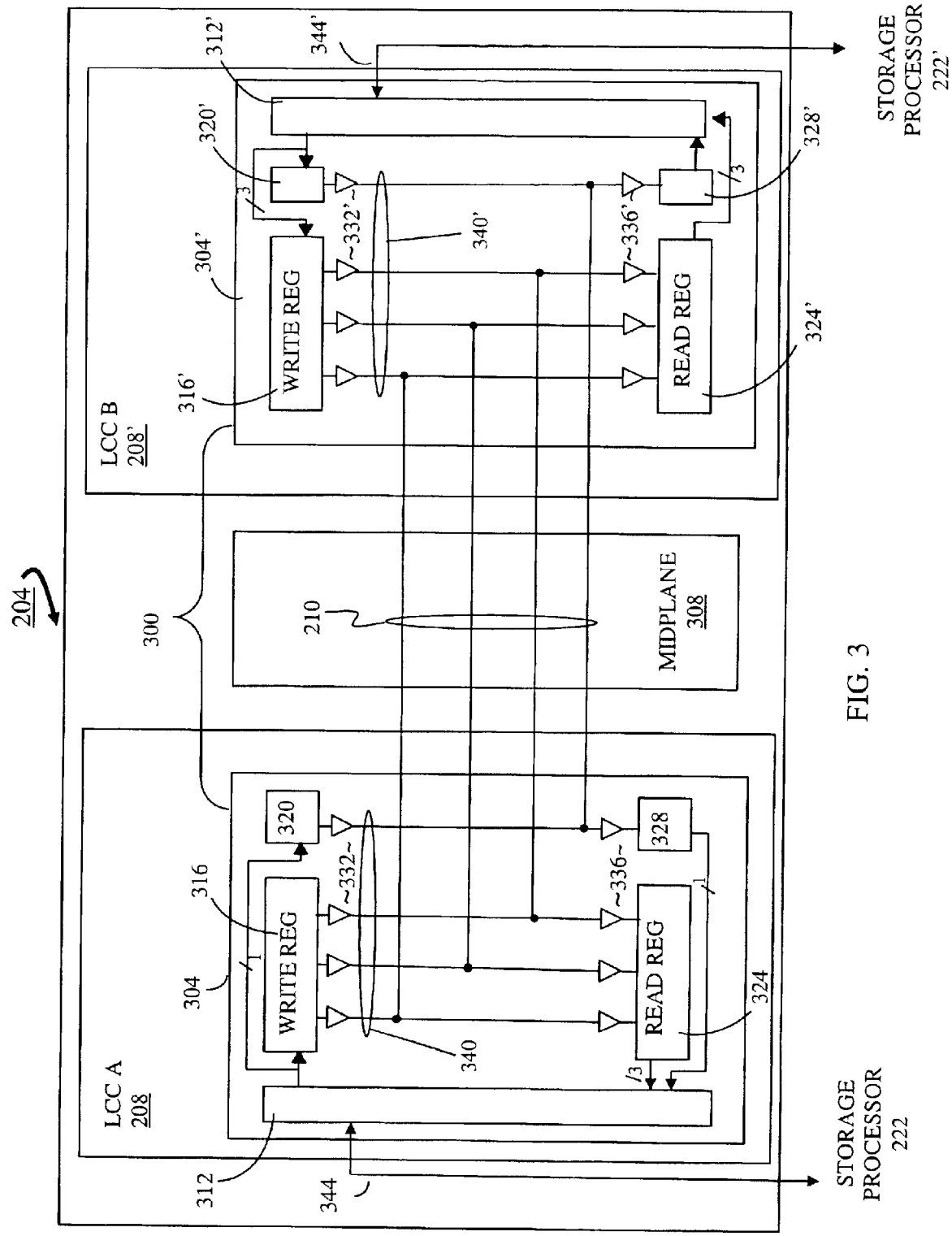
FIG. 3 is an embodiment of an enclosure having a comparator used to detect an improper cable connection in the storage system based on loop identifiers received by the enclosure.

FIG. 3 shows an embodiment of an enclosure 204 having a comparator 300 that is used to determine whether the LCCs 208, 208' (FIG. 2) of the enclosure 204 are properly connected to the same backend loop number. The enclosure 204 is representative of each of the enclosures 204 of FIG. 2. The comparator 300 includes a first circuit 304, a second circuit 304' and a midplane 308. The LCC 208 includes the first circuit 304 and the LCC 208' includes the second circuit 304'.

The midplane 308 includes the midplane connections 210 (FIG. 2), which electrically connect the first circuit 304 to the second circuit 304'. The midplane 308 is a functional equivalent of a backplane. Certain boards or cards (e.g., disk modules) plug into the midplane 308 from the front of the enclosure and other boards or cards, such as the LCCs 208, plug into the midplane 308 from the rear of the enclosure.

Each circuit 304, 304' includes a buffer 312, 312', a write register 316, 316', a write identification (ID) bit register 320, 320', a read register 324, 324', read ID bit register 328, 328', output buffers 332, 332' and input buffers 336, 336', respectively. Electrical connections 340 each connect one of the output buffers 332 to a different one of the input buffers 336. The number of electrical connections 340 depends upon the number of bits used to represent the range of possible backend identifiers. For example, in the embodiment shown, three of the electrical connections 340 are used to represent up to eight different backends. A fourth electrical connection 340 is used for a single bit which indicates if the loop ID has been written to the LCC.

Each of the electrical connections 340 of the first circuit 304 is electrically connected by one of the midplane connections 210 of the midplane 308 to a corresponding one of the electrical connections 340' of the second circuit 304'. In one embodiment, each midplane connection 210 produces a low output signal (i.e., "0" bit value) if either of the electrical connections 340, 340' has a "0" bit value.

Each buffer 312 is in electrical communication (directly or indirectly) with a respective one of the storage processors 222, 222' (FIG. 2) over a cable 344, 344'. The cable 344 can be any one of the cables 240, 244, 248, or 252 shown in FIG. 2 (similarly, for cable 344').

During operation, the storage processor 222 sends a broadcast message with a backend identifier of 0 over the communications port 228 (labeled 0) and message with a backend identifier of I over the communications port 232 (labeled 1). Similarly, the storage processor 222' sends broadcast messages over communications ports 228', 232' containing backend identifiers 0 and 1, respectively. Any enclosure receiving one or both of the broadcast messages from one or both of the storage processors 222, 222' processes each received message as described below.

For the sake of illustration, let the LCC 208 of enclosure 204' (FIG. 2), for example, receive a message with a loop ID of 0 and the LCC 208' of enclosure 204' receive another message with a loop ID of 1. (For embodiments in which the redundant backends are redundant loops, the backend identifiers are referred to as loop IDs.) The mismatch of loop IDs indicates that there is an improper cable connection in the storage system 200 (not shown in FIG. 2). Each buffer 312, 312' receives and stores the loop ID that it receives from the storage processor 222, 222', respectively, over the respective cable 344, 344'. In this example, buffer 312 receives the loop ID of 0, and buffer 312' receives the loop ID of 1. In the embodiment shown in FIG. 2, each loop ID is represented by a three-bit binary value, a "000b" for a loop ID of 0 and "001b" for the loop ID of 1.

Each buffer 312, 312' forwards its received loop ID to the respective write register 316, 316', and the write registers 316, 316' place the stored three-bit binary value representing the loop ID onto the respective electrical connections 340, 340'. One bit passes on each electrical connection. The output buffers 332, 332' electrically isolate the bit values on the electrical connections 340, 340', respectively, from the bit values stored in the write register 316, 316'.

As described above, the midplane connections 210 may change the bit values on the electrical connections 340, 340' based on the loop IDs received by each of the circuits 304, 304'. If the first circuit 304 received the same loop ID as the second circuit 304', then the bit values on the electrical connection 340, 340' are the same, and consequently the midplane connections 210 do not cause a change in the bit values. This outcome is indicative, although not conclusive, of the cables being correctly connected in the storage system.

If, as illustrated by our present example, the write registers 316, 316' store different loop ID bit values because an improperly connected cable exists in the storage system 200, the midplane connections 210 "combine" the different loop ID bit values to produce a new bit value or values. The new bit values together are referred to as a composite loop ID (referred to generally as a composite identifier). In our present example, the bit values for one loop ID are "000b" and for the other loop ID are "001b." Because each midplane connection 210 produces a 0 bit-value if any one of the combined bit values is 0, the resulting bit values are "000" for a composite loop ID of 0. Accordingly, the composite loop ID is the same as the loop ID received by the first circuit 304, but different from the loop ID received by the second circuit 304'.

As another example, let a loop ID of 5 (binary 101) pass to the first circuit 304 and the loop ID 3 (binary 011) pass to the second circuit 304'. The resulting composite loop ID becomes 1 (binary 001). This composite loop ID is different from both of the loop IDs received by the first and second circuits 304, 304'. These two examples illustrate that when there is a improper cable connection in the system, the composite loop ID differs from the loop ID received by one or both of the circuits 304, 304'.

Note that when the loop IDs are not the same, this mismatch indicates that there is a improper cable connection in the storage system 200 which may be involve a cable that is connected to the present enclosure 204 or that is connected to an intervening enclosure (that is, in the loop between the present enclosure and the host processor enclosure 206). An alarm mechanism, described below in connection with FIG. 4, employed by each enclosure 204 aids in pinpointing which enclosure has the improper cable connection.

The resulting bit values representing the composite loop ID pass into each of the read registers 324, 324'. The input buffers 336, 336' electrically isolate the bit values stored in the read registers 324, 324' from the bit values on the electrical connections 340, 340'.

Also during operation, each storage processor 222, 222' sends a message to each LCC 208 of enclosure 204 identifying the loop to which that enclosure 204 is connected. Each LCC 208 of each enclosure 204 stores this loop ID for subsequent use (described below). Once each LCC 208 stores the loop ID, a bit value (e.g., 1) is written to the appropriate read bit register 320 or 320'. The midplane connection 210 combines the bit values stored in the read bit registers 320, 320' and the composite bit value passes to the write bit registers 328, 328'. In one embodiment, if one or both of the LCCs 208 has not stored the loop ID, then the write bit registers 328, 328' each store a 0 bit value. From this bit value, the storage processors 222, 222' can determine whether a loop ID has been written to both LCCs (e.g., a 0 bit value indicating that the loop ID has not been written to one or both LCCs).

Figure 4:
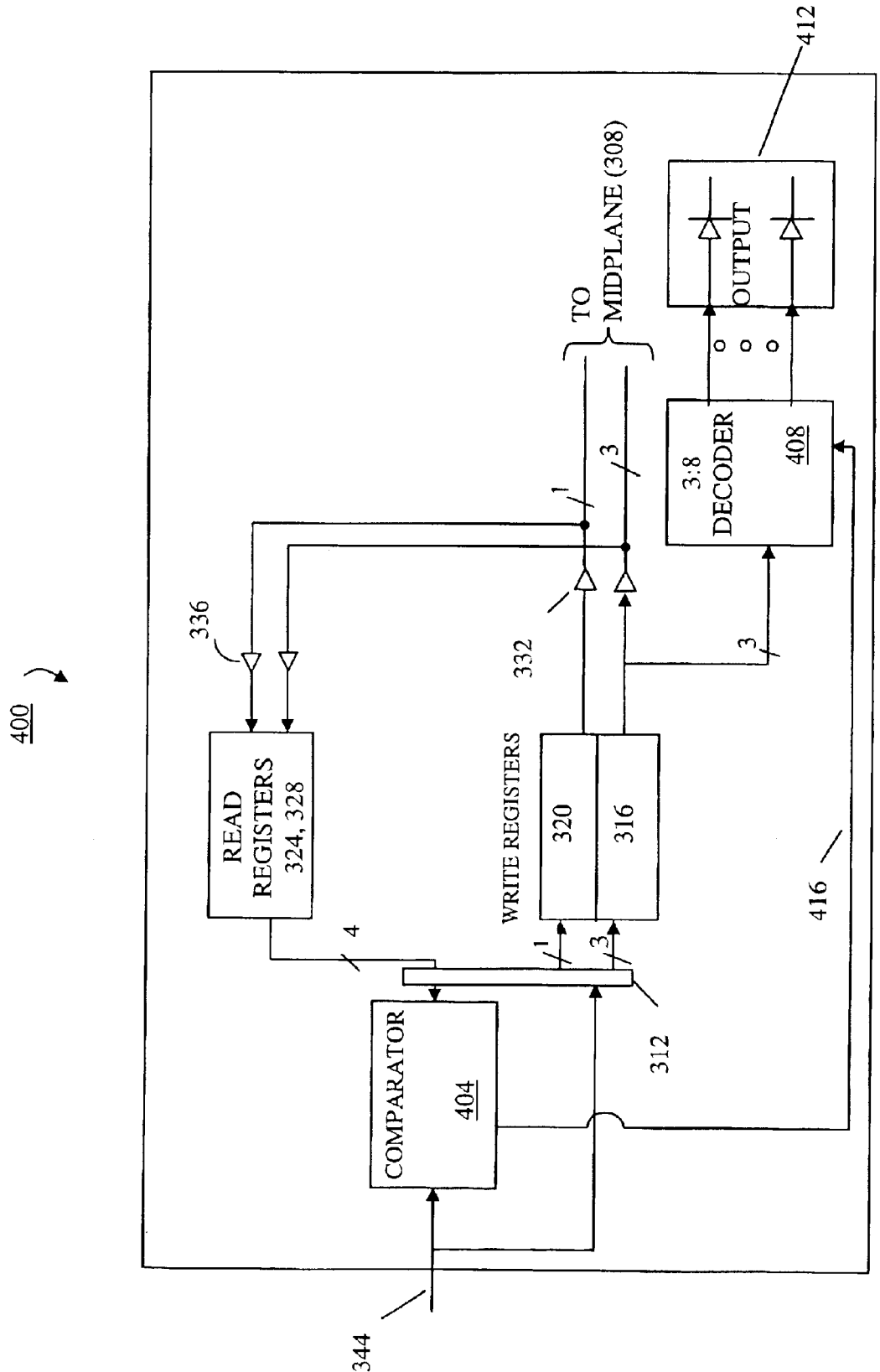
FIG. 4 is an embodiment of a comparator used to detect an improper cable connection in the storage system and to trigger an alarm.

FIG. 4 shows an embodiment of a detector 400 used by the LCCs 208 of FIG. 2 to signal detection of an improper cable connection. Implementations of the detector 400 can be in hardware, software, or a combination of both hardware and software (i.e., firmware). The detector 400 includes a comparator 404, the buffer 312, read and write registers 324, 316 and output and input buffers 332, 336 of FIG. 3, a decoder 408, and a plurality of light-emitting diodes (LEDs) 412.

The comparator 404 includes a first input terminal for receiving a loop ID from the storage processor 222 (FIG. 2) over cable 344 and a second input terminal for receiving the bit values stored in the read register 324 through the buffer 312. As described above, the bit values stored in the read register 324 is the composite loop ID, which may or may not be different from the loop ID received from the storage processor 222. An output terminal of the comparator 404 is in electrical communication with the plurality of LEDs 412. Each LED 412 is associated with a particular backend. An alternative embodiment uses a numeric, (i.e., liquid crystal or LED based) display, instead of the LEDs 412, to display a numeral that identifies a particular backend.

The buffer 312, read registers 324, 328, and write registers 316, 320 are in communication with each other and the midplane 308 as described above in FIG. 3. Also, the write register 316 is in electrical communication with the decoder 408. In one embodiment, the decoder 408 includes three input terminals and eight output terminals. Each of the three input terminals is in electrical communication with the write register 316 to receive a bit value. The bit values are obtained from the input side of the write output buffers 332, which electrically isolates the bit values from the midplane 308. Accordingly, the bit values that pass to the decoder 408 represent the loop ID that is received from the storage processor 222. Each of the eight output terminals is connected to one of the LEDs in the plurality of LEDs 412.

In operation, the comparator 404 receives a loop ID over cable 344 that originates from the storage processor 222. The loop ID also passes through the buffer 312 and is stored in the write register 316. The bit values representing the loop ID also pass to the input terminals of the decoder 408, which, based on the inputted bit values, asserts a signal on one of the output terminals that turns on the LED connected to that output terminal.

A composite loop ID, produced as described above, passes to the read register 324. The comparator 404 reads the bit values stored in the read register 324 and compares those bit values with the bit values of the loop ID received over the cable 344. If the bits values do not match, in one embodiment the comparator 404 sends a signal over the electrical connection 416 to the decoder 408 that causes the activated LED to flash. Note, if both LCCs 208, 208' of an enclosure 204 detect a mismatch, the enclosure has two flashing LEDs, one on each side ("A" and "B") of the enclosure 204.

Users who are troubleshooting a storage system with an improperly connected cable can locate the offending cable by looking specifically at the enclosure with one or more flashing LEDs. If more than one enclosure has a flashing LED, then the user can examine the enclosure that is closer in the loop to the host processor enclosure 206. In a loop topology, a cable improperly connected to an enclosure nearer to the host processor enclosure 206 than other enclosure(s) can cause those other enclosure(s) to also have a flashing LED. Correcting the cabling for the nearer enclosure, therefore, can remedy the mismatches detected by the other enclosure(s).

Figure 5:
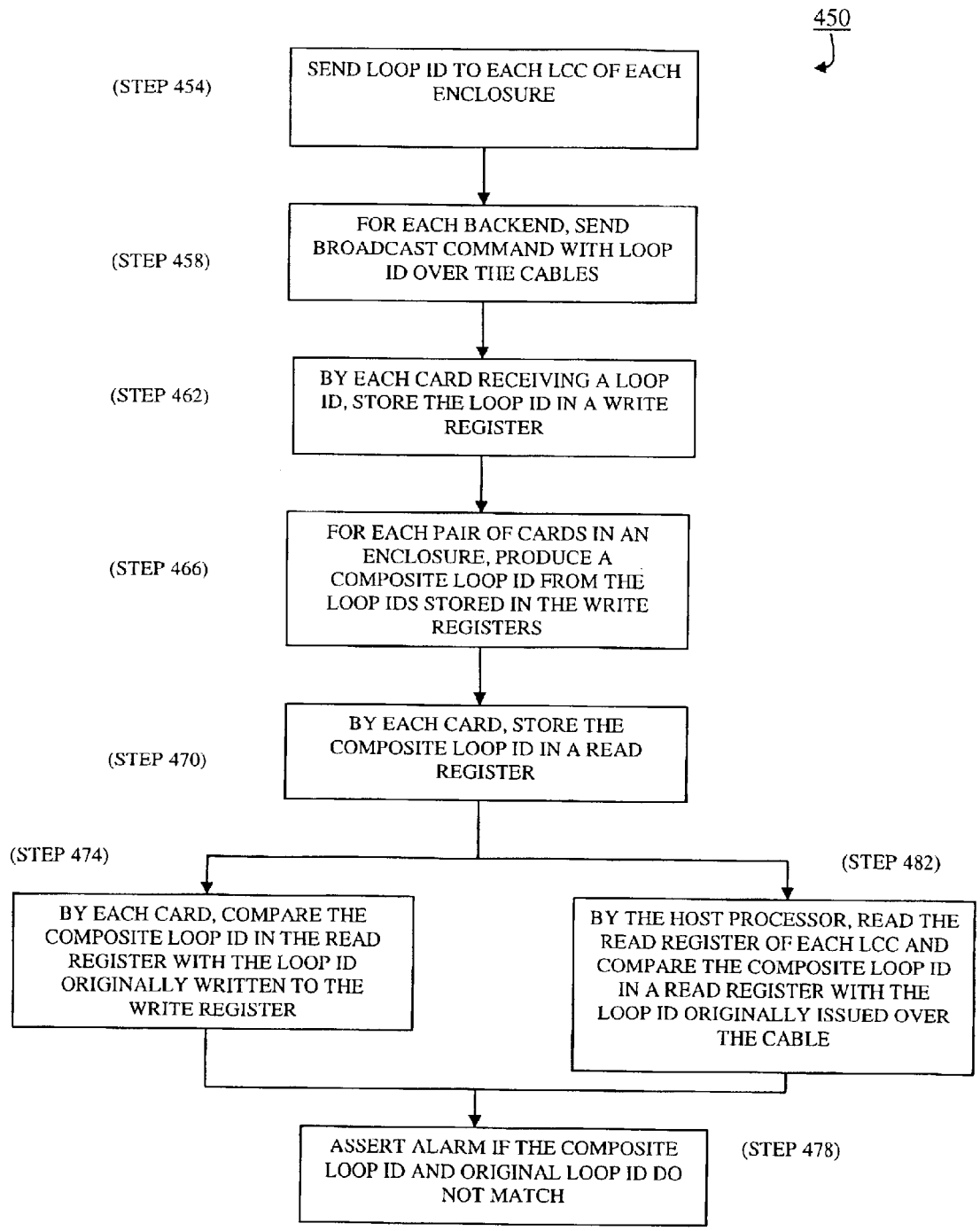
FIG. 5 is an embodiment of a process for detecting an improper cable connection in the storage system.

FIG. 5 shows an embodiment of a process 450 by which the storage system 200 of FIG. 2 determines whether there is an improper cable connection between enclosures. Initially, each storage processor 222, 222' sends (step 454) a message to each LCC 208 of each enclosure 204 that stores the loop ID. The storage processors 222, 222' each execute software that sends (step 458) out a broadcast message over each redundant backend. The broadcast messages include an identifier that identifies the backend (or the loop) over which that message is traveling. Loop ID 0 passes over cables 228, 228', loop ID 1 passes over cables 232, 232'.

Each enclosure 204 receives two loop ID signals, one on the A side and one on the B side. The loop ID circuits 304, 304' of each enclosure 204 store (step 462) each received loop ID in the respective write register 316, 316'. The midplane 308 then combines (step 466) the bit values in these write registers 316, 316' to produce a composite loop ID. The composite loop ID is stored (step 470) in the respective read registers 324, 324'.

The LCCs 208, 208' each compare (step 474) the composite loop ID with the loop ID that was originally received from the storage processor 222, 222', respectively. If the composite loop ID and the original loop ID do not match, then the LCC 208, 208 signals (step 478) an alarm (e.g., audible and/or visible). In one embodiment, the LCC causes an LED to flash. The alarm indicates that different backends are connected to the enclosure.

Also, each storage processor 222, 222' reads (step 482) the respective read register 324, 324' and compares the retrieved bit values with the loop ID that that storage processors 222, 222' sent over a cable. If the retrieved value does not match the sent value, then this is indicative of a cabling problem with the storage system 200. An alert can then issue from the storage processor that detects the mismatch. For example, the storage processor 200 can record the detected mismatch in an error log that can be read later by a system user.

While the invention has been shown and described with reference to specific preferred embodiments, it should be understood by those skilled in the art that various changes in form and detail may be made therein without departing from the spirit and scope of the invention as defined by the following claims.

What is claimed is:

1. A storage system, comprising:
an enclosure having boards, each board being connected by a different cable to a redundant backend network, each board having a communication port that receives a message identifying a redundant backend network to which that board is connected, the storage system being determined to have an improper cable connection if the message received by one of the boards identifies a different redundant backend network than the message received by another of the boards.

2. The system of claim 1, wherein the enclosure comprises a midplane that produces a composite identifier from an identifier in each of the messages received by the boards.

3. The system of claim 2, wherein each board comprises a comparator that compares the composite identifier with the identifier in the message received by that board.

4. The system of claim 3, wherein each board comprises an alarm mechanism that is triggered when the identifier in the message and the composite identifier are different.

5. The system of claim 2, further comprising a host processor enclosure in communication with one of the boards of the enclosure to read the composite identifier, the host processor enclosure comparing the composite identifier with an identifier in the message sent to that one of the boards to determine whether the system has an improper cable connection.

6. The system of claim 1, wherein the redundant backend network comprises redundant loops.

7. The system of claim 6, wherein the loops are Fibre Channel arbitrated loops.

8. An enclosure for a storage system, comprising:
   a first and a second card, each card having a communications port;
   a first cable connecting the first card to a first redundant backend network and conveying an identifier to the communications port of the first card, and a second cable connecting the second card to a second redundant backend network and conveying an identifier to the communications port of the second card, each identifier identifying the redundant backend network to which that card receiving the identifier is connected; and
   means for determining if the first redundant backend network identified by the first identifier is different than the second redundant backend network identified by the second identifier to determine thereby whether the storage system has an improper cable connection.

9. The system of claim 8, further comprising means for combining the identifier conveyed to the port of the first card with the identifier conveyed to the port of the second card to produce a composite identifier.

10. The system of claim 9, further comprising a host processor that compares the composite identifier with at least one of the identifiers conveyed to the communications ports of the first and second cards and determines that the cards are connected to different networks if compared identifiers are different.

11. The system of claim 9, wherein each of the first and second cards includes a comparator that compares the composite identifier with the identifier received by that card.

12. The system of claim 8, further comprising an alarm that is triggered when the cards are connected to different networks.

13. The system of claim 8, wherein the alarm includes a flashing light-emitting-diode.

14. The system of claim 8, further comprising a host processor connected to the communications ports of the first and second cards by the first and second cables originating the identifiers conveyed by the first and second cables.

15. The system of claim 14, wherein the host processor includes a first processor that produces the identifier conveyed by the first cable and a second processor that produces the identifier conveyed by the second cable.

16. A method of testing connectivity of cabling in a storage system implementing redundancy, the method comprising;
   receiving at a first card in an enclosure a first identifier over a first cable identifying a first redundant backend network to which the first card is connected by the first cable;
   receiving at a second card in the enclosure a second identifier over a second cable identifying a second redundant backend network to which the second card is connected by the second cable; and
   determining that the storage system has art improper cable connection if the first redundant backend network identified by the first identifier is different than the second redundant backend network identified by the second identifier.

17. The method of claim 16, further comprising combining the first and second identifiers to produce a composite identifier.

18. The method of claim 17, further comprising comparing the composite identifier with at least one of the first and second identifiers and determining that the cards are connected to different redundant backend networks if compared identifiers are different.

19. The method of claim 17, further comprising triggering an alarm when the cards are connected to different redundant backend networks.

20. The method of claim 19, wherein the triggering of the alarm includes flashing a light-emitting-diode.

* * * * *

UNITED STATES PATENT AND TRADEMARK OFFICE
CERTIFICATE OF CORRECTION

PATENT NO. : 6,809,505 B2
DATED : October 26, 2004
INVENTOR(S) : Peeke et al.

It is certified that error appears in the above-identified patent and that said Letters Patent is hereby corrected as shown below:

<u>Title page,</u>
Item [75], Inventors, after "Brian K. Bailey" delete "Sterling, MA" replace with -- Mendon, MA --.

<u>Column 10,</u>
Line 24, "art" should be changed to -- an --.

Signed and Sealed this

Nineteenth Day of April, 2005

JON W. DUDAS
*Director of the United States Patent and Trademark Office*